March 6, 1928.  E. P. BULLARD, JR  1,661,786
AUTOMOBILE BUMPER
Filed Dec. 18, 1926

INVENTOR.
Edward P. Bullard, Jr.
BY
Chamberlain & Newman
ATTORNEYS.

Patented Mar. 6, 1928.

1,661,786

UNITED STATES PATENT OFFICE.

EDWARD P. BULLARD, JR., OF STRATFORD, CONNECTICUT, ASSIGNOR TO THE BULLARD MACHINE TOOL COMPANY, OF BRIDGEPORT, CONNECTICUT, A CORPORATION OF CONNECTICUT.

AUTOMOBILE BUMPER.

Application filed December 18, 1926. Serial No. 155,630.

The present invention relates to improvements in automobile bumpers, particularly of the type employing a plurality of spaced primary or impact bars, and secondary bars, the latter being disposed rearwardly and in the horizontal plane of the space between said impact bars, and being connected at their outer ends in relation to the outer ends of said impact bars.

Heretofore constructions have been provided in which the ends of the primary and secondary bars were connected by a vertically disposed pivot pin or pintle, and whereby a relative pivotal movement was provided between the bars, this movement resulting in considerable wear and consequent looseness and rattling in the connection. It is an object of the present invention, therefore, to provide a construction, whereby a compact, easily assembled connection is effected, and which will provide a substantially rigid interlocking connection between the bars, so that they are held against relative pivotal movement.

A further object is to provide an improved mounting, in which the mounting brackets are directly connected to both the impact and secondary bars, and particularly, in which the impact bars are connected to a forward portion of the mounting brackets and the secondary bars are connected at a point rearwardly of said forward portion.

With the above and other objects in view, embodiments of the invention are shown in the accompanying drawings, and these embodiments will be hereinafter more fully described with reference thereto, and the invention will be finally pointed out in the claims.

In the drawings:—

Similar reference characters indicate corresponding parts throughout the several figures of the drawings.

Figure 1:
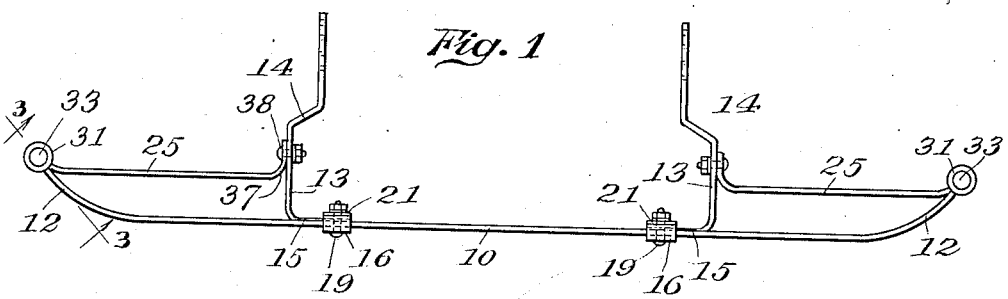
Fig. 1 is a plan view of an automobile bumper, according to one embodiment of the invention.
Figure 2:
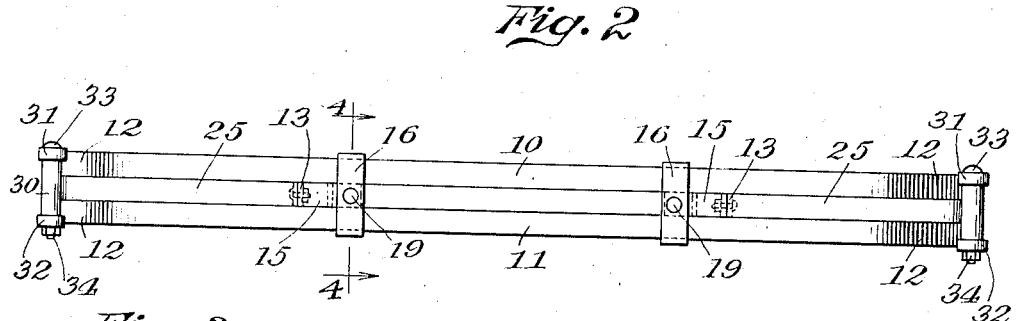
Fig. 2 is a front view thereof.
Figure 3:
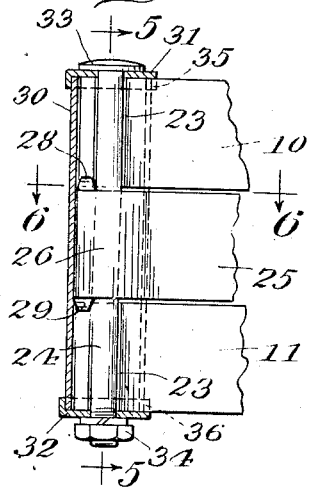
Fig. 3 is an enlarged vertical sectional view of the end connection, and taken along the line 3—3 of Fig. 1.
Figure 4:
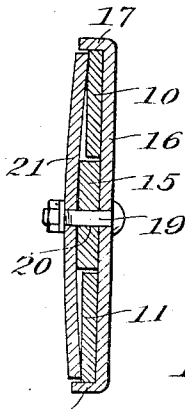
Fig. 4 is a vertical sectional view of the mounting bracket connection to the primary bars, and taken along the line 4—4 of Fig. 2.
Figure 5:
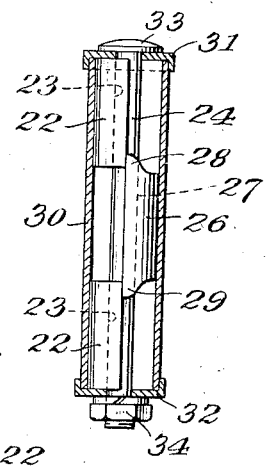
Fig. 5 is a vertical sectional view, taken along the line 5—5 of Fig. 3.
Figure 6:
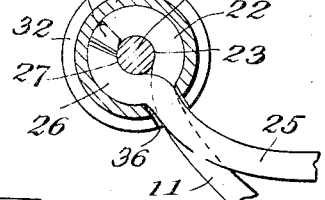
Fig. 6 is a horizontal sectional view, taken along the line 6—6 of Fig 3.

Referring to the drawings, the bumper, according to the present embodiment of the invention, comprises upper and lower impact bars 10 and 11, arranged horizontally one above the other in parallel spaced relation. The opposed end structures of these bars, together with the connected cooperating and associated parts are duplicates of each other, the bars at each end being curved rearwardly, as at 12. In inwardly spaced relation to their ends the bars are connected to supporting bracket arms 13, angularly bent, as at 14, at an intermediate point rearwardly of the impact bars, the portions of said arms at each side of said portion 14 being in parallel relation to each other and in planes at right angles to the plane of the bars. The forward ends of the bracket arms are bent inwardly in the plane of the impact bars, as at 15, and are engaged between the bars, where they are secured by means of a clip comprising a forward plate 16 vertically disposed transversely of the bars and flanged at its upper and lower ends, as at 17 and 18, to engage the upper and lower edges of the impact bars, and being connected centrally by a bolt 19 extended through a hole 20 in the bracket portion 15 to a rearward spring plate 21, curved along its length, so that its ends pressingly engage the bars 10 and 11 adjacent the flanges 17 and 18, said bars 10 and 11 preferably being of less metal thickness than the bracket arm, as clearly shown in Fig. 4.

The extreme end portions of the impact bars 10 and 11 are of like formation, being bent into semi-circular shape, as shown, to form an enlargement or head 22 on one side, and a concave recess 23 upon the opposite side, to accommodate a bolt 24, hereinafter more fully referred to.

The secondary bars 25, of which there is employed one in the rear of the make-up of each end portion of the bumper, are relatively short in length, and somewhat like the impact bars are each provided with an enlargement 26 upon one side of their outer ends and a concave recess 27 upon the opposite side, to also accommodate the bolt 24.

In this connection it will be seen that the transverse concave recess or pocket 27 as formed on the secondary bar is on the one side, while the recesses or pockets 23 as formed on the impact or primary bars are disposed in opposite relation, yet they are in proper engagement with the bolt. At the upper and lower end corners of the secondary bar there are formed abutment lugs 28 and 29, projecting upwardly and downwardly in continuation of the vertical end surface of said bar into abutting relation with the vertical end surfaces of the impact bars, and adapted through such engagement to prevent pivotal movement of the end portions of the impact and secondary bars relatively to each other.

It will be seen that the end portions of the two impact bars and an end portion of the secondary bar are stacked one upon the other, and are engaged within a vertically slotted tubular member or case 30, the shank portion of said bars being positioned in the slot of the tube, while the enlarged curved headed portions are housed in the tube in surrounding relation to the bolt 24. Flanged end caps 31 and 32, centrally apertured to receive the bolt, are engaged over the ends of the tube, the head 33 at one end of the bolt engaging the upper cap 31 and the nut 34 screwed upon the other end engaging the lower cap 32. The flanges of the caps are notched, as at 35 and 36, in line with the slot of the tube to receive the top and bottom edges of the impact bars.

The secondary bars 25 have their inner end portions bent rearwardly, as at 37, in engagement with the mounting bracket arms, and are secured thereto by bolts 38.

Figure 7:
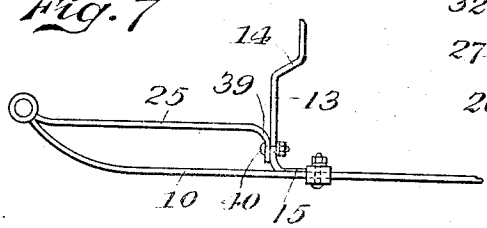
Fig. 7 is a plan view of one end of a modified form.

In Fig. 7 I have illustrated a modification, in which the inner end portion of the secondary bar is bent forwardly toward the impact bars, as at 39, and is secured to the bracket arm in a similar manner to the first form by a bolt 40.

I have illustrated and described preferred and satisfactory embodiments of the invention, but it will be obvious that changes may be made therein, within the spirit and scope thereof, as defined in the appended claims.

Having thus described my invention, what I claim and desire to secure by Letters Patent is:—

1. The combination of two or more bars arranged one above the other, a tubular element embracing the ends of said bars, a bolt extending axially through said tubular element to secure said bar ends therein, and means upon one bar end adapted to interlockingly connect another of said bars within said tubular element, whereby relative pivotal movement between said bars is prevented.

2. The combination of two or more primary bumper bars arranged one above the other in spaced relation, a secondary bumper bar at each end having an end disposed between the superimposed ends of said primary bars, a tubular element embracing the superimposed ends of said primary and secondary bars, a bolt extending axially through said tubular element to secure said bar ends therein, and means upon the end of one bar adapted to interlockingly connect another of said bar ends within said tube, whereby relative pivotal movement between said bars is prevented.

3. The combination of two or more primary bumper bars arranged one above the other in spaced relation, a secondary bumper bar at each end having an end disposed between the superimposed ends of said primary bars, a tubular element embracing the superimposed ends of said primary and secondary bars, a bolt extending axially through said tubular element to secure said bar ends therein, and abutment means on the ends of said secondary bars abutting the ends of said primary bars, whereby relative pivotal movement between said bars is prevented.

4. The combination with a tube having a longitudinal slot, of a series of bumper bars having their end portions positioned one above the other in said slot and the end portions of the alternate bars being bent to form enlargements on opposite sides of the alternate bars within the tube, a bolt passing axially through said tube in engagement with the bars to hold the parts together, and means on the end of one of said bars forming an abutment between the said bars adjacent bars to prevent relative pivotal movement between them.

5. The combination of two or more primary bumper bars arranged one above the other in spaced relation, a mounting bracket secured to said primary bars and extending rearwardly therefrom at a point removed from the bar ends, a secondary bumper bar having an end connected with the end portions of the primary bars and its other end directly connected to said mounting bracket at a point rearwardly of the primary bars.

Signed at Bridgeport in the county of Fairfield and State of Connecticut this 16th day of December, A. D. 1926.

EDWARD P. BULLARD, Jr.